United States Patent [19]

Osawa et al.

[11] Patent Number: 5,725,790
[45] Date of Patent: Mar. 10, 1998

[54] ORGANOPOLYSILOXANE AND FIBER FINISHING COMPOSITION CONTAINING THE SAME AS MAIN COMPONENT

[75] Inventors: Yoshihito Osawa; Satoshi Kuwata, both of Gunma-ken, Japan

[73] Assignee: Shin-Etsu Chemical Co., Ltd., Tokyo, Japan

[21] Appl. No.: 780,841

[22] Filed: Jan. 10, 1997

[30] Foreign Application Priority Data

Jan. 12, 1996 [JP] Japan ..................... 8-021794

[51] Int. Cl.$^6$ ............. D06M 13/356; C08G 77/14; C08G 77/26
[52] U.S. Cl. ............. 252/8.62; 252/8.61; 106/287.11; 528/28; 528/33; 556/413; 556/425
[58] Field of Search ............. 252/8.61, 8.62; 106/287.11; 528/28, 33; 556/413, 425

[56] References Cited

U.S. PATENT DOCUMENTS

| 4,381,396 | 4/1983 | Ryang | 549/237 |
|---|---|---|---|
| 4,404,350 | 9/1983 | Ryang | 528/26 |
| 4,511,701 | 4/1985 | Ryang | 525/533 |
| 4,517,342 | 5/1985 | Ryang | 525/431 |
| 4,522,985 | 6/1985 | Ryang | 525/431 |
| 4,533,737 | 8/1985 | Ryang | 548/110 |
| 4,595,732 | 6/1986 | Ryang | 525/417 |
| 4,598,135 | 7/1986 | Buese | 528/33 |
| 4,634,755 | 1/1987 | Hallgren et al. | 528/23 |
| 4,675,372 | 6/1987 | Policastro | 528/26 |
| 5,391,400 | 2/1995 | Yang | 252/8.62 |
| 5,496,401 | 3/1996 | Yang | 252/8.62 |
| 5,562,761 | 10/1996 | Dirschl et al. | 252/8.62 |

OTHER PUBLICATIONS

Chemical Abstract No. 116:21738 which is an abstract of Japanese Patent Specification No. 03195735 (Aug. 1991).

*Primary Examiner*—Anthony Green
*Attorney, Agent, or Firm*—Millen, White, Zelano, & Branigan, P.C.

[57] ABSTRACT

Provided are an organopolysiloxane represented by the following formula (I), which has at least one norbornane skeleton and at least one amino group, and a fiber finishing composition containing as a main component the aforesaid organopolysiloxane:

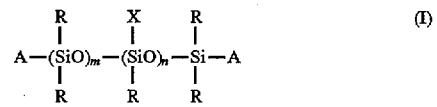

(I)

wherein R groups are the same or different, and each of them represents an alkyl group containing 1 to 20 carbon atoms or an aryl group containing 6 to 20 carbon atoms; X is a group represented by the following formula (II); A groups are the same or different, and each of them represents an alkoxy group containing 1 to 10 carbon atoms, a hydroxyl group, R or X; m is from 10 to 10,000; and n is from 0 to 500, wherein when n is 0 at least one A group represents X;

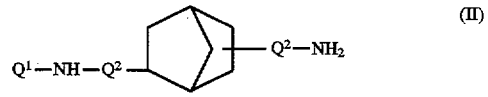

(II)

wherein $Q^1$ and $Q^2$ are the same or different, and each represents a divalent organic group containing 1 to 20 carbon atoms.

12 Claims, No Drawings

ORGANOPOLYSILOXANE AND FIBER FINISHING COMPOSITION CONTAINING THE SAME AS MAIN COMPONENT

FIELD OF THE INVENTION

The present invention relates to a novel organopolysiloxane, more particularly to an organopolysiloxane suitable for a main component of a fiber finishing agent, and a fiber finishing composition using such an organopolysiloxane.

BACKGROUND OF THE INVENTION

Hitherto, various types of organopolysiloxanes, such as a dimethylpolysiloxane, a polysiloxane containing epoxy groups and a polysiloxane containing aminoalkyl groups, have been widely used as finishing agents for imparting flexibility, Smoothness and so on to various kinds of textiles. In particular, a polysiloxane containing aminoalkyl groups has been prevailingly used because it can provide highly satisfactory flexibility.

However, the polysiloxane containing aminoalkyl groups has a defect that the color tones of the textiles finished therewith become yellowish due to oxidation of the aminoalkyl groups under exposure to heat, ultraviolet rays or so on. In addition, the polysiloxane containing aminoalkyl groups has a drawback in that, since the treatment therewith generally provides water repellency, the treatment turns fibers hydrophobic even if the fibers have water absorbency in themselves.

With the intention of obviating the foregoing defect, it has been proposed to modify the aminoalkyl groups by the reaction of an aminoalkyl-containing polysiloxane with, e.g., an organic acid anhydride or chloride (Tokkai Sho 57-101076, wherein the term "Tokkai" means an "unexamined published Japanese patent application"), a higher fatty acid (Tokkai Hei 1-306683), or a carbonate (Tokkai Hei 2-47371).

However, such modification results in lowering of a flexibility-imparting ability which is characteristic of an aminoalkyl-containing siloxane, although the color-tome change for yellow can be diminished.

With the intention of mitigating the aforementioned drawback, for instance, the introduction of polyoxyalkylene groups into an aminoalkyl-containing siloxane (Tokkai Sho 59-179885) has been proposed. However, the presence of polyoxyalkylene groups causes a considerable drop in flexibility.

As measures improvements over the foregoing proposals, the polysiloxanes containing cyclohexylaminoalkyl groups (Tokkai Hei 1-298283, Tokkai Hei 1-97279 and Tokkai Hei 3-21666) and the polysiloxanes containing cyclic diamines (Tokkai Hei 4-214470) are disclosed.

Further, there are disclosed the siloxanes containing norbornane skeletons (Tokko Hei 4-71410, Tokko Hei 1-34995, wherein the term "Tokko" means an "examined Japanese patent publication", and Tokkai Hei 3-195735). However, a polysiloxane containing amino groups together with norbornane skeletons is not yet known.

SUMMARY OF THE INVENTION

As a result of our intensive studies to solve the aforementioned problems, it has been found that, when an aminosiloxane having certain kinds of norbornane skeletons is used as a component of a fiber finishing agent, not only the fibers finished with such a agent has good flexibility but also the cloth finished therewith has a reduced color-tone change for yellow and assumes water repellency to a slight extent, thereby achieving the present invention.

Therefore, a first object of the present invention is to provide an organopolysiloxane suitable for the main component of a fiber finishing agent.

A second object of the present invention is to provide a fiber finishing composition which can impart excellent flexibility, high resistivity against color-tone change for yellow and reduced water repellency to the cloth finished therewith.

The above-described objects of the present invention are attained with an organopolysiloxane represented by the following formula (I) and a fiber finishing composition containing as a main component the aforesaid organopolysiloxane:

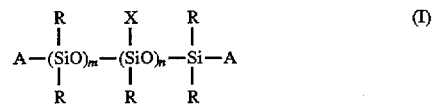

wherein R groups are the same or different, and each of them represents an alkyl group containing 1 to 20 carbon atoms or an aryl group containing 6 to 20 carbon atoms; X is a group represented by the following formula (II); A groups are the same or different, and each of them represents an alkoxy group containing 1 to 10 carbon atoms, a hydroxyl group, R or X; m is from 10 to 10,000; and n is from 0 to 500, wherein when n is 0 at least one A group represents X;

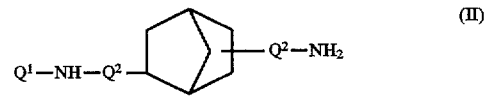

wherein $Q^1$ and $Q^2$ are the same or different, and each represents a divalent organic group containing 1 to 20 carbon atoms.

DETAILED DESCRIPTION OF THE INVENTION

Specific examples of a group represented by R include a methyl group, an ethyl group, a propyl group, a butyl group, a pentyl group, a beryl group, a heptyl group, an octyl group, a nonyl group, a decyl group, a tetradecyl group, an octadecyl group, a phenyl group, a tolyl group and a naphthyl group. From the view point of imparting high flexibility to fibers, it is especially desirable for R to be a methyl group.

Each of A groups represents an alkoxy group containing 1 to 10 carbon atoms, a hydroxyl group, or the foregoing R or X group, and both A groups may be the same as or different from each other. In viewing the characteristics of the present composition, however, the present organopolysiloxane is required to contain at least one X group per molecule. Accordingly, when n is 0, at least one A group is required to be an X group. Specific examples of an alkoxy group represented by A include a methoxy group, an ethoxy group, a propoxy group, a butoxy group, a hexyloxy group, a heptyloxy group, an octyloxy group and a decyloxy group.

m is a figure ranging from 10 to 10,000. Particularly, it is desirable for m to be from 20 to 2,000. When m is a figure smaller than 10, the corresponding organosiloxane is insufficient in flexibility providing capability; while, when m is a figure greater than 10,000, the corresponding organosiloxane is difficult to handle because of its high viscosity. On the other hand, n is a figure ranging from 0 to 500, especially preferably from 0 to 200. Even when n is increased beyond 500, the organopolysiloxanes represented by formula (I) have no change in their effects. Therefore, it is bad economy to choose as n a figure greater than 500.

From the viewpoint of ensuring flexibility, it is desirable that the ratio of n to the sum of n and m (n/(n+m)) be from 0.001 to 0.1, particularly from 0.005 to 0.05.

Specific examples of $Q^1$ and $Q^2$ in formula (II) include alkylene groups, such as a methylene group, an ethylene group, a propylene group, a butylene group, a pentylene group, a hexylene group, a heptylene group, an octylene group, a nonylene group and a decylene group; the alkylene groups as recited above whose carbon atoms are in part replaced by other atom(s) such as oxygen or sulfur atom(s); and the alkylene groups as recited above whose hydrogen atoms are all or in part replaced by halogen atom(s) or other organic group(s) such as hydroxyl group(s). In particular, it is desirable that $Q^1$ be a propylene group and $Q^2$ be a methylene group.

Specific examples of an organopolysiloxane according to the present invention are illustrated below:

Also, the present organopolysiloxanes can be prepared by allowing a haloalkyl-modified organopolysiloxane and bis-(aminomethyl)norbornane to undergo condensation reaction according to conventional condensation synthesis methods.

Additionally, branched units may be introduced into those organopolysiloxane skeletons. Further, it is possible to treat those organopolysiloxanes with an organic acid, an inorganic acid, an organic acid anhydride, a carbonate, an organic epoxy compound or so on.

In using the organopolysiloxane of the present invention as a fiber finishing agent to finish various sorts of fibers, it is diluted with an appropriate solvent so as to have a desired concentration, or dispersed into water with the aid of a surfactant to form an emulsion and then diluted with water so as to have a desired concentration, made to adhere to fibers using a proper means, e.g., dipping, spraying, a roll or a brush as a means of coating, and then dried at room temperature or by heating. In this case, the amount of the organopolysiloxane to adhere to fibers has no particular limitations. However, it is generally sufficient for finishing

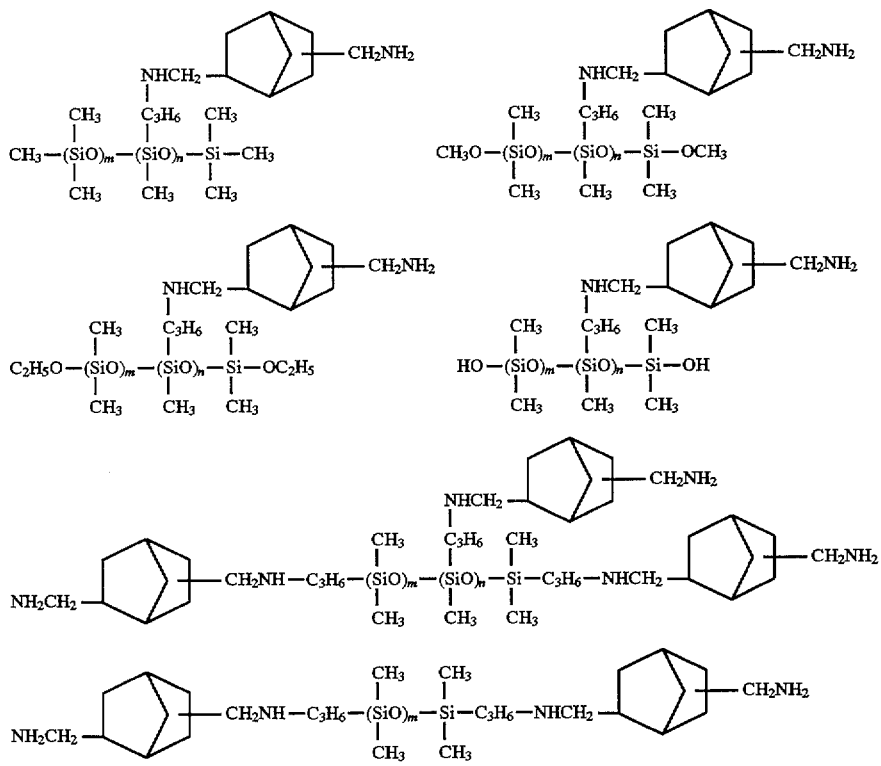

The organopolysiloxanes of the present invention can be synthesized with ease according to known synthesis methods. For instance, they can be prepared by subjecting (i) a cyclic siloxane such as octamethylcyclotetrasiloxane, (ii) amino-methyl[(N-(3-(dimethoxymethylsilyl)propyl) aminomethyl]norbornane or a hydrolysis condensate thereof as a starting material for amino component, and (iii) other starting materials selected from among hexamethyldisiloxane, α,ω-dihydroxydimethylpolysiloxane, diethoxydimethylsilane and the like to equilibrated reaction in the presence of a catalyst, such as hydroxide of an alkali metal, tetramethylammonium hydroxide or tetrabutylphosphonium hydroxide.

fibers to make the organopolysiloxane adhere to fibers in a proportion of from about 0.01 to about 10 weight % to the fibers.

As for the solvent usable therein, toluene, xylene and isopropyl alcohol are examples thereof.

As for the surfactant used for the foregoing emulsification, it is possible to select a proper surfactant from known surfactants, including anionic surfactants such as sodium alkylsulfates and sodium alkylbenzenesulfonates, nonionic surfactants such as polyoxyethylene alkyl phenyl ethers, polyoxyethylene alkyl ethers and sorbitan fatty acid esters, and cationic surfactants such as quaternary ammonium salts.

The fiber finishing agent according to the present invention has no particular restriction as to fibers to be finished therewith. More specifically, it can finish any sorts of fibers, including natural fibers, such as cotton, hemp, silk and wool fibers; synthetic fibers, such as polyester, polyamide, polyacrylonitrile, polyethylene, polypropylene, Vinylon, polyvinyl chloride and Spandex fibers; semisynthetic fibers, such as acetate fiber; reclaimed fibers, such as rayon and Bemberg fibers; glass fibers; and carbon fibers.

Further, the present finishing agent can be applied to fibers of any shape and form. More specifically, not only fibers of raw material forms, such as staple, filament, tow and thread forms, but also those of processed forms, such as forms of textile, knitted goods, cotton wadding, nonwoven cloth, paper, sheet and film, can be the subjects for a finish of the present fiber finishing agent.

Novel organopolysiloxanes according to the present invention have an advantage in that they can be easily prepared by utilizing a known equilibrated reaction or condensation synthesis method. The fiber finishing agent according to the present invention can be prepared with ease by mixing the novel organopolysiloxanes of the present invention with known additives and a solvent so as to be in a emulsified or dissolved condition, or so as to have a form of paste or spray.

The compositions using as the main component the present aminosiloxanes containing norbornane skeletons can be widely used as fiber finishing agent since the fibers finished with those compositions have excellent flexibility, and less color-tone change for yellow and less water repellency than fibers finished with conventional siloxanes containing aminoalkyl groups.

The present invention will now be illustrated in greater detail by reference to the following examples. However, the invention should not be construed as being limited to these examples. Additionally, all "%" and all "parts" described below are by weight unless otherwise noted, and the term "viscosity" signifies the value determined at 25° C.

EXAMPLES

Synthesis Example 1

To a 2-liter separable flask equipped with a stirrer, a thermometer, a reflux condenser and a nitrogen gas admitting tube, 860 g of octamethylcyclotetrasiloxane and 140 g of aminomethyl[(N-(3-dimethoxymethylsilyl)propyl) aminomethyl)]norbornane were placed, and heated with stirring as a nitrogen gas was admitted thereinto. The moment the temperature inside the flask reached 110° C, 0.5 g of tetrabutylphosphonium hydroxide was added as a equilibration catalyst. Those reactants were subjected to 6-hour equilibration reaction and further to 3-hour heat treatment at 150° C. Thus, a colorless transparent liquid having the average structural formula represented by formula (1) (Organopolysiloxane-1) was obtained. The viscosity of this liquid was 100 cs.

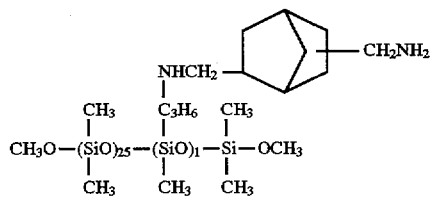

(1)

Synthesis Example 2

Another organopolysiloxane (Organopolysiloxane-2) was prepared in the same manner as in Synthesis Example 1, except that the amount of octamethylcyclotetrasiloxane used was changed to 980 g from 860 g and the amount of aminomethyl[(N-(3-(dimethoxymethylsilyl)propyl) aminomethyl)]norbornane used was changed to 20 g from 140 g. The thus obtained organopolysiloxane was a colorless transparent liquid having a viscosity of 1,100 cs, and had the following average structural formula (2).

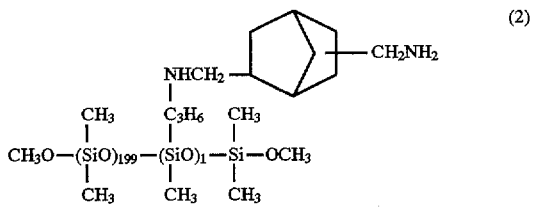

Synthesis Example 3

Still another organopolysiloxane (Organopolysiloxane-3) was prepared in the same manner as in Synthesis Example 1, except that the amount of octamethylcyclotetrasiloxane used was changed to 926 g from 860 g, the aminomethyl [N-(3-(di-methoxymethylsilylpropyl)aminomethyl)] norbornane used was replaced by 64 g of hydrolysis condensates thereof, and further 10 g of hexamethyldisiloxane was used. The thus obtained organopolysiloxane was a colorless transparent liquid having a viscosity of 1,500 cs, and had the following average structural formula (3).

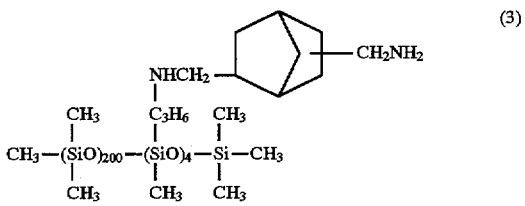

EXAMPLE 1

Organopolysiloxane-1 obtained in Synthesis Example 1 in an amount of 300 g was dispersed into 670 g of water in the form of emulsion using a homomixer and 30 g of polyoxyethylene nonyl phenyl ether (the number of ethylene oxide units: 10) as an emulsifier to prepare Emulsion-1 as a fiber finishing agent.

EXAMPLE 2

Emulsion-2 as a fiber finishing agent was prepared in the same manner as in Example 1, except that Organopolysiloxane-2 obtained in Synthesis Example 2 was used in place of Organopolysiloxane-1.

EXAMPLE 3

Emulsion-3 as a fiber finishing agent was prepared in the same manner as in Example 1, except that Organopolysiloxane-3 obtained in Synthesis Example 3 was used in place of Organopolysiloxane-1.

COMPARATIVE EXAMPLE 1

Emulsion-4 as a fiber finishing agent was prepared in the same manner as in Example 1, except that Organopolysiloxane-4 represented by the following formula (4) was used in place of Organopolysiloxane-1.

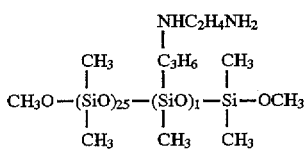

(4)

COMPARATIVE EXAMPLE 2

Emulsion-5 as a fiber finishing agent was prepared in the same manner as in Example 1, except that Organopolysiloxane-5 represented by the following formula (5) was used in place of Organopolysiloxane-1.

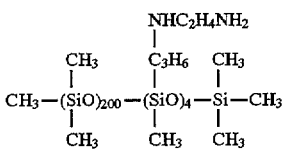

(5)

Each of the emulsions prepared in the aforementioned Examples and Comparative Examples was diluted with water so as to have an organopolysiloxane concentration of 1.5%, and therein Tetoron/Cotton broad cloth treated with a fluorescent dye was soaked. Thereafter, the water was squeezed out of the cloth using rollers under a squeeze rate of 100%. Then, the cloth was dried at 100° C. for 2 minutes, and further subjected to a 2-minute heat treatment at 150° C. The characteristics of the thus treated cloth (sample cloth) was evaluated according to the criteria described below.

Evaluation of Flexibility:

The flexibility of a sample cloth was evaluated by the touch. When the sample cloth was smooth to the touch, the flexibility thereof was marked ○; while when the sample cloth was rough to the touch, the flexibility thereof was marked X.

Evaluation of Water Absorbency:

Water droplets having a size of about 50 µl were put on the surface of a sample cloth, and the time required for the water droplets to be absorbed into the sample cloth was measured.

Evaluation of Yellowing Resistance:

A sample cloth was heated at 200° C. for 2 minutes, and the yellowing resistance thereof was evaluated by the color measurement with a color-difference meter, ZE2000 (commercial name, a product of Nippon Denshoku Kogyo Co., Ltd.). Additionally, the smaller value obtained by the measurement indicates that the sample cloth has the higher yellowing resistance.

The evaluation results obtained are shown in Table 1.

TABLE 1

|  | Flexibility | Water Absorbency (second) | Yellowing Resistance |
|---|---|---|---|
| Example 1 | ○ | 110 | −.4.5 |
| Example 2 | ○ | 160 | −5.2 |
| Example 3 | ○ | 130 | −4.9 |
| Comparative Example 1 | ○ | 200< | −4.0 |
| Comparative Example 2 | ○ | 200< | −4.6 |
| Untreated cloth | X | 70 | −5.3 |

What is claimed is:

1. An organopolysiloxane represented by the following formula (I):

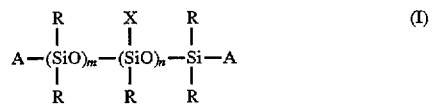

(I)

wherein R groups are the same or different, and each of them represents an alkyl group containing 1 to 20 carbon atoms or an aryl group containing 6 to 20 carbon atoms; X is a group represented by the following formula (II); A groups are the same or different, and each of them represents an alkoxy group containing 1 to 10 carbon atoms, a hydroxyl group, R or X; m is from 10 to 10,000; and n is from 0 to 500, wherein when n is 0 at least one A group represents X;

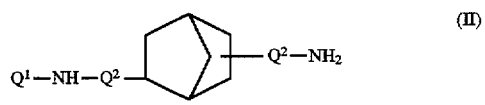

(II)

wherein $Q^1$ and $Q^2$ are the same or different, and each represents a divalent organic group containing 1 to 20 carbon atoms.

2. An organopolysiloxane according to claim 1, wherein the R groups in formula (I) are methyl groups.

3. An organopolysiloxane according to claim 1, wherein the number represented by m in formula (I) is in the range of 20 to 2,000.

4. An organopolysiloxane according to claim 1, wherein the number represented by n in formula (I) is in the range of 0 to 200.

5. An organopolysiloxane according to claim 1, wherein the ratio of n to the sum of n and m in formula (I) is in the range of 0.001 to 0.1.

6. An organopolysiloxane according to claim 1, wherein the groups represented by $Q^1$ and $Q^2$ in formula (II) are a propylene group and a methylene group respectively.

7. A fiber finishing composition containing an organopolysiloxane as a main component, said organopolysiloxane being an organopolysiloxane according to claim 1.

8. A fiber finishing composition according to claim 7, wherein the organopolysiloxane is contained in the form of aqueous emulsion.

9. A fiber finishing composition according to claim 7, further comprising an organic solvent.

10. The organopolysiloxane of claim 1, wherein each R is the same or different and is methyl, ethyl, propyl, butyl, pentyl, hexyl, heptyl, octyl, nonyl, decyl, tetradecyl, octadecyl, phenyl, tolyl, or naphthyl.

11. The organopolysiloxane of claim 5, wherein the ratio is from 0.005 to 0.05.

12. The organopolysiloxane of claim 1, wherein the each $Q^1$ and $Q^2$ are the same or different and are methylene, ethylene, propylene, butylene, pentylene, hexylene, heptylene, octylene, nonylene or decylene; optionally having carbon atoms replaced by oxygen or sulfur atoms; and optionally having hydrogen atoms replaced by halogen atoms or hydroxyl groups.

* * * * *